United States Patent [19]

Jolly et al.

[11] 4,044,167

[45] Aug. 23, 1977

[54] METHOD FOR AROMATIZING SOLUBLE COFFEE

[75] Inventors: Michael D. Jolly, Highland Mills, N.Y.; Anthony T. Nacci, Bergenfield; Gaetano J. DeCeglie, Palisades Park, both of N.J.; Rudolf A. Vitti, Dumont, N.J.

[73] Assignee: General Foods Corporation, White Plains, N.Y.

[21] Appl. No.: 252,757

[22] Filed: May 12, 1972

[51] Int. Cl.² .............................................. A23F 1/04
[52] U.S. Cl. .................................. 426/594; 426/302; 426/386
[58] Field of Search ............... 99/65, 71, 140 R; 426/386, 387, 388, 443, 444, 518

[56] References Cited

U.S. PATENT DOCUMENTS

| 2,947,634 | 8/1960 | Feldman et al. | 99/71 |
| 3,244,533 | 4/1966 | Clinton et al. | 99/71 |
| 3,261,689 | 7/1966 | Ponzoni | 99/71 |
| 3,406,074 | 10/1968 | Klein et al. | 99/71 |
| 3,554,761 | 1/1971 | Carbonell | 99/71 |
| 3,565,635 | 2/1971 | Mahlmann | 426/444 X |

OTHER PUBLICATIONS

Sivetz, Coffee Processing Technology, vol. II, 1963, pp. 53.

Primary Examiner—Frank W. Lutter
Assistant Examiner—N. Greenblum
Attorney, Agent, or Firm—Thomas R. Savoie; Daniel J. Donovan; Bruno P. Struzzi

[57] ABSTRACT

A process for aromatizing soluble coffee products has been developed wherein coffee aromas are added to a liquid glyceride carrier, such as oil, solidified, such as by freezing, comminuted and then blended with soluble coffee. According to a preferred embodiment of this invention carbohydrate solids, such as coffee solids are added to the oil prior to adding the aroma.

4 Claims, No Drawings

METHOD FOR AROMATIZING SOLUBLE COFFEE

BACKGROUND OF THE INVENTION

Soluble coffee powders are normally deficient in the aromas found in fresh roasted and ground coffee due to loss of aromas during the production of the soluble coffee, especially during the drying operation. Previous attempts at replacing the aromas lost during the production of soluble coffee products have been disclosed in the prior art such as U.S. Pat. Nos. 3,148,070 issued to Mishkin et al. and 2,947,634 issued to Feldman et al. Both these patents teach the production of an aromatized oil which is then spray plated onto the surface of soluble coffee products. This spray plating step, however, results in a considerable loss of aromatics and the retention of the spray plated aroma, which is solely on the surface of the soluble coffee product, is not particularly great.

It would be desirable to aromatize soluble coffee products by a process which does not lose significant amounts of volatiles during the aromatization process and which stabilizes the aromatized coffee product such that significant amounts of aroma are retained by the product even when subjected to prolonged exposure to room conditions.

SUMMARY OF THE INVENTION

By means of this invention, it has been found that a soluble coffee product may be aromatized, that is provided with the pleasant coffee aroma which is detected upon initially opening a can of roasted and ground coffee. According to this invention, coffee aromas containing natural and/or synthetic volatile aromatic compounds are combined with a liquid carrier such as an oil. This aromatized carrier is then solidified or frozen by lowering the temperature to below the congealing or freezing point of the carrier and the solid material is comminuted to a desired particle size distribution. This particulate material is then throughly blended with a soluble coffee such as conventional spray dried or freeze dried coffee. It has been found that when the uniformly blended particles of frozen aromatized carrier are held at room temperature or above liquefication occurs and the aromatized carrier plates or spreads over the surface of the soluble coffee particles.

As a preferred embodiment of this invention it has been found that increased stability and/or retention of the aromas is obtained if carbohydrate solids are combined with the glyceride carrier prior to adding the aromas. This process further eliminates loss of aromatics since the aroma is apparently fixed in a glyceride-solids "complex." It has additionally been found that the presence of soluble solids in the aromatized glyceride facilitates the formation of a frozen material which is relatively hard and which is readily comminuted in conventional grinding equipment.

DESCRIPTION OF THE INVENTION

Soluble coffee products are aromatized according to this invention in a manner such that large amounts of aromas are not lost during the aromatization process, and, according to a preferred embodiment of this invention the aromas are further stabilized such that they will tend to remain with the soluble coffee product even after the product has been repeatedly exposed to room conditions.

According to this invention natural and/or synthetic aromas are combined with a liquid, preferably an oil, carrier, solidified, comminuted and blended with a soluble coffee product.

Typical of the aromas which are useful for aromatizing soluble coffee products are the aromas obtained from roaster and grinder gases and the condensates obtained from the steam distilled volatile aromas described in U.S. Pat. Nos. 2,562,206 to Nutting, 3,132,947 to Mahlmann, 3,148,070 to Mishkin et al., 3,244,521 to Clinton et al., 3,421,901 to Mahlmann et al., 3,532,507 to Cascione, and 3,615,665 to White et al., and the vacuum-distilled volatile aromas described in U.S. Pat. Nos. 2,680,687 to Lemonnier and 3,035,922 to Mook et al.

Suitable for use as the carrier are the glycerides such as triacetin, coffee oil and the bland-tasting vegetable oils such as cottonseed oil, coconut oil and like fatty materials. The carrier should be chosen such that it does not detract from the aroma of or impart off-flavors to the soluble coffee product, does not effect the solubility of the soluble coffee product and has a storage stability at least equal to the soluble coffee. The glyceride is preferably a liquid under normal conditions so that heat will not be required either during blending of the aromas with the glyceride or in order to have the aromatized solid particles melt and spread over the surface of the soluble coffee particles.

The liquid glyceride and aromas may be combined by gently mixing the condensed aromas with the glyceride or by adsorbtion of the aroma by the glyceride. Preferably this step should take place at reduced temperatures in order to minimize loss of aroma.

As previously mentioned, carbohydrate solids may be contained within the aroma-glyceride mixture in order to obtain an aroma-glyceride-solids "complex" which will increase the stability of the aromas both during processing and during subsequent storage and use of the aromatized soluble coffee product. Soluble coffee solids are the preferred type of soluble solids since the addition of non-coffee material is avoided; however, other water-soluble or water-dispersible carbohydrates such as hydrolyzed cereal solids, dextrins, gum arabic and the like may also be employed. Addition of even a small amount of these solids has proven to be beneficial; however, normally when the solids are added to the glyceride they will be added in the amount of at least 10% by weight of the glyceride component and preferably up to the point where the solids are no longer readily dispersed in the glyceride, usually about 40%.

According to this invention the glyceride, either with or without added solids, is aromatized and then is cooled to at or below the point at which it becomes solid and rendered suitable for communication. Preferably the aromatized glyceride is frozen to such a low temperature, such as by contacting it with liquid nitrogen, that the frozen material is capable of being ground in conventional grinding equipment.

The frozen and comminuted or ground particles are next added to and throughly blended with soluble coffee powder such as that obtained from conventional spray drying, freeze drying or agglomeration processes. As the frozen particles melt the aromatized oil spreads or plates the surface of adjacent particles of soluble coffee producing an aromatized coffee product. Also it has been found that additional soluble coffee particles become attached to the oil wetted particles forming a shell or agglomerate which provides added protection for the aromas.

This invention is further illustrated but not limited by the following example.

EXAMPLE

Grinder gas obtained from conventional Gump grinding of fresh roasted coffee is condensed as a frost at liquid nitrogen conditions. Two parts by weight of this condensed frost is blended with a mixture of one part of expressed coffee oil and one part of spray dried coffee solids. This blend is then quickly frozen in liquid nitrogen and the resulting solid is ground through a 40 U.S. mesh screen. These frozen particles are then blended with spray dried coffee powder at a level of 1.5% by weight of the spray dried coffee. The blend was permitted to come up to ambient temperature and was packaged under an inert atmosphere in glass containers. The thus prepared spray dried coffee products are found to possess preferred jar aromas as compared to comparable samples which are spray plated with an equivalent amount of grinder gas in oil in terms of both initial impact after prolonged storage and aroma retention during in use conditions.

Having thus described the invention what is claimed is:

1. A method for producing an aromatized soluble coffee product comprising the steps of:
   a. combining coffee grinder gas aroma and water-soluble or water dispersible carbohydrate solids with a liquid glyceride, the carbohydrate solids being present at from 10 to about 40% by weight of the glyceride,
   b. cooling the aromatized glyceride-carbohydrate material to a solid state,
   c. comminuting the solidified aromatized glyceride-carbohydrate material,
   d. blending the comminuted particles with a soluble coffee powder,
   e. permitting the blend to warm to at least room temperature whereby liquefaction of the solidified aromatized glyceride-carbohydrate material occurs and the aromatized liquid spreads over the surface of the soluble coffee powder.

2. The method according to claim 1 wherein the aromatized glyceride is solidified by freezing and comminuted by grinding.

3. The method according to claim 4 wherein the carbohydrate solids are soluble coffee solids.

4. The method according to claim 3 wherein the carbohydrate solids are added to the glyceride prior to adding the grinder gas aroma.

* * * * *

UNITED STATES PATENT AND TRADEMARK OFFICE
CERTIFICATE OF CORRECTION

PATENT NO. : 4,044,167

DATED : August 23, 1977

INVENTOR(S) : Michael D. Jolly et al.

It is certified that error appears in the above-identified patent and that said Letters Patent are hereby corrected as shown below:

In column 2, line 53, change "communication" to -- comminution -- .

In claim 3, line 1, change "4" to -- 1 -- .

Signed and Sealed this

Twenty-eighth Day of March 1978

[SEAL]

Attest:

RUTH C. MASON
Attesting Officer

LUTRELLE F. PARKER
Acting Commissioner of Patents and Trademarks